United States Patent [19]

Enderle et al.

[11] Patent Number: 4,942,671
[45] Date of Patent: Jul. 24, 1990

[54] PROBE HEAD MOUNT FOR A DEFLECTABLE PROBE OR THE LIKE

[75] Inventors: Eckhard Enderle, Aalen-Dewangen; Hans-Peter Aehnelt, Oberkochen; Dieter Kaufmann, Heidenheim, all of Fed. Rep. of Germany

[73] Assignee: Carl-Zeiss-Stiftung, Oberkochen, Fed. Rep. of Germany

[21] Appl. No.: 277,710

[22] Filed: Nov. 30, 1988

[30] Foreign Application Priority Data

Jul. 20, 1988 [DE] Fed. Rep. of Germany ....... 3824549

[51] Int. Cl.$^5$ ............................................. G01B 11/24
[52] U.S. Cl. ....................................... 33/559; 33/561; 33/556
[58] Field of Search .................. 33/503, 556, 558, 559, 33/561, 572

[56] References Cited

U.S. PATENT DOCUMENTS 4,532,713 8/1985 Feichtinger ........................... 33/559

FOREIGN PATENT DOCUMENTS 3603269 8/1987 Fed. Rep. of Germany ........ 33/559

Primary Examiner—Harry N. Haroian
Attorney, Agent, or Firm—Hopgood, Calimafde, Kalil, Blaustein & Judlowe

[57] ABSTRACT

Truncated pyramid mounting configurations and relationships are disclosed as inherently and reproducibly determining an accurate zero-position as between a probe head and a probe pin that is deflectably carried by the probe head. And the same principle of accurately determining zero position is also described in application to the automated releasable chucking of interchangeable probe pins and/or of an auxiliary probe head, as to the installed probe head of a coordinate-measuring machine.

In one described case of truncated triangular pyramid mountings, the zero position is determined by concurrent engagement of six seating points which are distributed radially and axially with respect to the common central longitudinal axis of the involved geometric pyramids.

The mounting configurations have high torsional rigidity and a relatively large region within which self-centering to the zero position is achieved.

Furthermore, thise mounting configurations are characterized by an azimuth-angle distribution of relatively uniform force in opposition to a probe-pin or the like deflection, and associated lift-off, from the fully seated zero position.

23 Claims, 4 Drawing Sheets

PROBE HEAD MOUNT FOR A DEFLECTABLE PROBE OR THE LIKE

Background of the Invention

Mechanical probes of the so-called "switching" type, as are used in coordinate-measuring techniques, have a movable probe or probe pin which is spring-urged into a bearing system which reproduces with high precision the zero position of the probe or probe pin. At the instant of contact with a workpiece, the probe is lifted out of its bearing against the force of the spring and then produces a pulse-like switch signal which characterizes the contacting. In mounting the probe pin, it is customary to use the so-called "kinematic three-point mount" described in U.S. Pat. No. 4,153,998 in which three radially extending cylindrical arms can seat in V-bearings which are defined by balls or rollers. This arrangement provides excellent reproducibility, and it is furthermore torsionally rigid with respect to rotation about the longitudinal axis of the probe pin.

Similar mounts are also used for attaching a selected one of a plurality of replaceable probe pins to a replacement holder on the probe head of a coordinate-measuring instrument. Such a replacement holder or chuck is described, for example, in U.S. Pat. No. 4,637,119.

From the journal "Microtecnik" of 2/1986, pages 43–46, it is furthermore known to provide such a mount for the replaceable attachment of complete probe heads on the measurement arm of a multiple-coordinate measuring machine.

The described three-point mounts have various disadvantages. On the one hand, the region within which the part to be held is self-centering when returning to its seated or at-rest position is relatively small, since this region is determined by the diameter of the pairs of balls of the mount. And a further disadvantage is encountered when mounting a probe pin in a switching probe head. Specifically, the contacting force, i.e., the force which the probe pin exerts on the workpiece which is to be measured, is direction-dependent; it changes by a factor of two depending on whether, when deflected, the probe pin tilts directly above one of the three points of at-rest support, or is tilted about the connecting line formed by two of these three points. This angular dependence of contact force is a source of measurement error in the determination of work-contact coordinates. Corresponding studies have been published in the journal "Technisches Messen TM" 1979, issue No. 2, pages 47–52 and 161–169.

Federal Republic of Germany Patent No. 3,229,992 discloses a probe head having a probe mount which is a combination of a truncated cone and a torus. Admittedly, work-contact force is independent of the direction of probe deflection, since the bearing is symmetrically engaged for the zero or at-rest condition. However, the probe pin is not secured against rotation about its longitudinal axis. Thus, with this probe mount, it is not possible to use probe pins having any probe balls which are eccentrically positioned, i.e., off the longitudinal axis of the probe pin.

Federal Republic of Germany Patent No. 3,603,269 discloses a probe head with a probe-pin mount which has an anti-rotational feature, to prevent rotation of the probe pin about its longitudinal axis. For this purpose, the base end of the probe pin is elongate and relies upon longitudinally spaced reference locations within a cylindrical probe-head housing. At one of these locations, a first part of the probe-pin shaft is developed as a truncated pyramid which will seat against three balls in a fixed part of the housing. A second similar mount at a different one of these locations involves a second part of the probe-pin shaft. The two parts of the probe-pin shaft are ball-guided for relative longitudinal displaceability and a spring urges the probe-pin shaft parts in their respective directions to seat at their respective longitudinally spaced locations. Probe-pin deflection is accompanied by an unseating of one of the mounts.

The latter probe head has various disadvantages. On the one hand, the construction is complex and manufacture is relatively difficult; also, the quality of the ball guide affects the accuracy of probe-pin mounting Furthermore, the torsional rigidity of the probe pin is not particularly great, since the surfaces of the truncated-pyramid part of the probe pin contact the balls of the mount centrally, i.e., at locations where forces to produce restoring torque are very small.

Brief Statement of the Invention

The object of the present invention is to provide a mount for a probe head on a coordinate measuring instrument, for a probe in a probe head, or for a replaceable element on a probe head, which mount is of the simplest possible construction, is torsionally rigid, and reproducibly centers itself automatically to its zero position, from within the largest possible deflection range.

The invention achieves this object by providing a geometric array of at least six seating points of mounting contact to establish the zero or at-rest position, as between a deflectable-probe or the like component and a mounting component with respect to which the probe or the like component is deflectable or otherwise movable. One of these components has a longitudinal axis about which the at least six seating points are distributed in radially spaced, axially spaced and angularly spaced relation; and this distribution is over each of the geometric lateral sides of the frustum which results from truncating a regular pyramid, wherein the said longitudinal axis is the longitudinal axis of the pyramid.

In addition to the advantages which have been stated within the above object, it must be emphasized that a probe which has been thus mounted to a probe head exhibits practically no dependence upon work-contact force directed away from the zero position. Since, in accordance with the invention, punctiform or areal resting surfaces cooperate with relatively large mating surfaces, the self-centering action of the mount is assured within a very large region.

As compared to the probe head described in said German Patent No. 3,603,269, a probe head of the invention is of substantially simpler construction, inasmuch as the zero position of the mounted component is determined by at least six simultaneously operative seating points of a single bearing support, and a second, axially spaced mating mount can be avoided. And since the seating points are spaced from each other and are offset from the center lines of the side surfaces of the truncated pyramid, the mount is of great torsional rigidity.

When the pyramid is three-sided, i.e., a triangular pyramid, it is advisable to develop the mount such that the movable component develops its zero position in the mounting component, via six discrete points of seating contact. The at-rest position of the movable component is then kinematically unambiguously determined; furthermore, bearing friction is minimized by reason of punctiform seating-point contacts, so that reproducibility of the zero position of the movable component is excellent. Elongate regions of line contact, as established by knife edges or by cylindrical rollers, are also suitable for accurate zero-position determination, in that each line of contact is in reality a linear succession of point contacts. And the indicated advantages of point contacts or line contacts can also be achieved by provision of fluid or air-bearing action between matched coacting surface areas of like truncated positive and negative pyramid configuration, for friction-free determination of the at-rest or zero position.

In order to reduce the friction and increase the precision of attaining the zero position, it is advisable for the seating-contact points of the mount to be formed by inserts of a material which is hard as compared with remaining body material of the respective components.

If balls are selected to establish the discrete seating points, they can be retained with rotational mobility in a ball cage, thus further reducing friction. It is then advisable to produce the ball surfaces and ball-engaging mating surfaces with such accuracy that a displacement of the balls and thus of the seating points does not result in positional uncertainty of the movably mounted component.

With respect to torsional rigidity of the movably mounted component, it is particularly advantageous for the truncated pyramid of the mount to have the shape of a three-sided pyramid, i.e., a triangular pyramid. Such a pyramid makes it possible so symmetrically to arrange the seating points so that each of the three surfaces of the pyramid has two of six seating points. In such an arrangement, the reaction force sustained by the mount by reason of a given tilting deflection of the probe-pin axis is very uniform, regardless of the direction of such deflection.

Present use of the expression "truncated pyramid" or "pyramid frustum" is to be understood as being descriptive of geometric surface configurations which determine the plural seating points in space. Admittedly, the two components of the mount itself, i.e., the bearing seat in the "fixed" component and the body of the movable component which has a received zero position with respect to the "fixed" component can have the shapes of matching positive and negative pyramids, respectively. However, this is not absolutely necessary. Thus, it is always sufficient if only one of the two coacting parts, i.e., either the fixed or the movable component, has the shape of a truncated pyramid, depending (1) on which component is to provide each particular seating-surface area, and (2) if the coacting seating points on the other component are suitably interconnected and positioned with respect to each other. It is also to be understood that the seating-surface areas alone are the only fragments of the pyramid that are needed in the region of the seating points. The rest of the involved component can be replaced by some other shape, as long as suitable precaution is taken to avoid interference with the self-centering action of the movable component.

Thus, for example, the corners of the truncated pyramid can be cut off or partially rounded, as a result of which the bearing base, i.e., the distance between spaced seating points, referred to a given outside diameter of the mounting, can be increased.

Detailed Description

The invention will be described in detail for several embodiments, in conjunction with the accompanying drawings, in which:

FIG. 5 is another perspective view to show further modified contact features for a probe similar to that of FIG. 3a;

FIG. 10 is a perspective view of another probe embodiment which is modified as compared with FIG. 3a.

Figure 1:
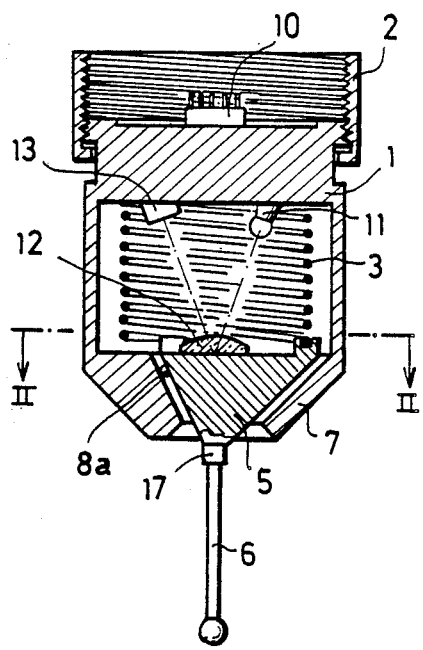
FIG. 1 is a simplified sectional diagram of a probe head with a movable probe and having probe-mounting features of the invention, as seen in a plane containing the longitudinal axis of the probe and with the probe in its zero or at-rest position.
Figure 2:
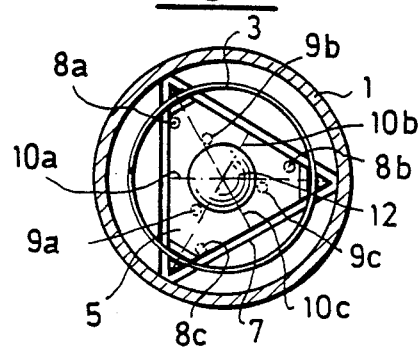
FIG. 2 is a sectional view, taken along the line II—II of FIG. 1.

The probe head of FIGS. 1 and 2 has a cylindrical housing 1 which can be secured by means of a cap nut 2, directly or via an extension piece, to the measurement arm of a coordinate-measuring instrument. At its top end, housing 1 is provided with a connector 10 having contact pins for different electrical connections to the probe head.

Housing 1 tapers down conically at its opposite end, where it is internally configured to define a bearing part 7 for mounting the base 5 of a probe pin 6 that is movable with respect to housing 1. The base 5 which is movably mounted in bearing part 7 is continuously urged into its zero position by a spring 3. A piezoelectric sensor 17 between probe parts 5 and 6 provides recognition of a workpiece contact in the course of a measurement procedure, by producing an electrical signal at the instant when the probe pin 6 makes contact with the workpiece. The operation of such a sensor is described in detail in U.S. Pat. No. 4,177,568 and therefore need not now be repeated.

Figure 3A:
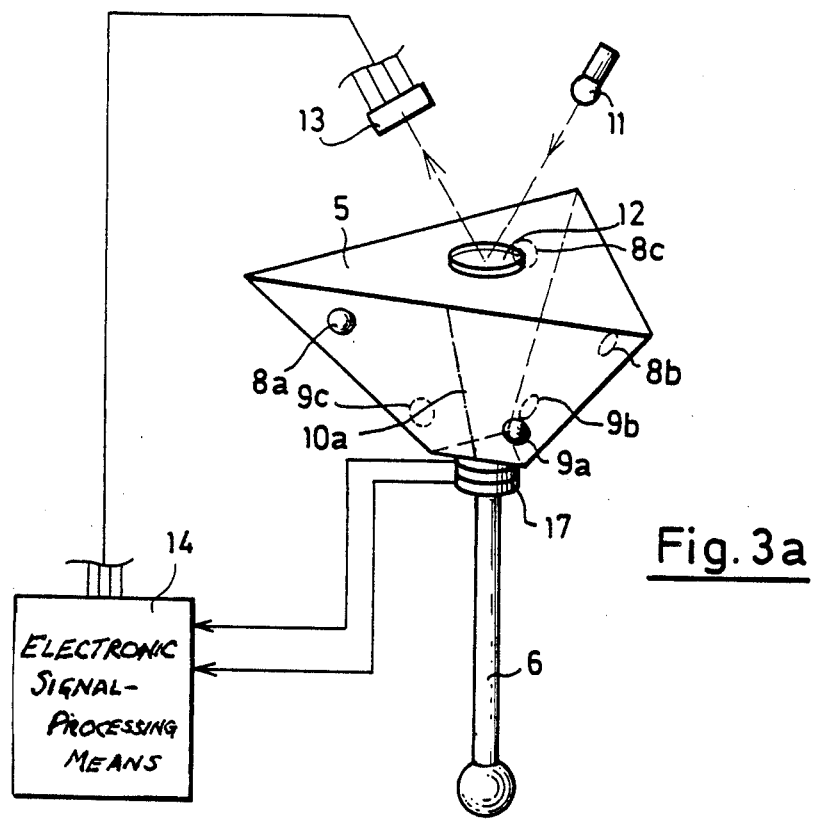
FIG. 3a is a simplified perspective view of the movable probe of FIGS. 1 and 2.

In order to recognize the zero position of probe pin 6, a light-emitting diode 11 and a four-quadrant diode 13 are fixedly mounted to and within housing 1, and a mirror-backed lens 12 is fixedly mounted to the upper end of the probe base 5. Lens 12 focuses the luminous surface of light-emitting diode 11 on the quadrant diode 13, and the signal output of diode 13 serves to verify the initial work-contact signal of the piezoelectric sensor 17, the same being produced in the course of a work-contacting procedure. The electronic system in which these two signals of the probe are processed is designated 14 (FIG. 3a). Such a device is also known from said U.S. Pat. No. 4,177,568 and therefore need not be described here.

As can be noted from the sectional view in FIG. 2 and the perspective view in FIG. 3a, base 5 of the probe pin 6 has the shape of a truncated triangular pyramid which, at six discrete seating points, makes contact with correspondingly shaped mating surfaces of the bearing mount 7 at the lower part of housing 1. The seating points derive from convex formations on the probe base 5, and these formations are designated 9(a–c) and 8(a–c) in FIGS. 2 and 3a.

In this first embodiment, each of the three faces of the truncated pyramid establishes two associated seating points. These pairs of points 8a/9a, 8b/9b and 8c/9c are not only radially offset from the central axis of probe 5, 6 but they also lie off the centerlines, designated 10(a,b and c) in FIGS. 2 and 3(a), of the faces of the truncated pyramid; specifically, three seating points 8(a–c) near the broader base end of the truncated pyramid are arranged to the left of the centerlines 10(a,b,c), and the three remaining seating points 9(a–c) are spaced apart axially in the direction towards the vertex of the pyramid and are disposed to the right of the corresponding centerlines 10(a,b,c). This radial and axial spacing of the seating points assures the torsional rigidity of probe mounting to the probe-head housing 1.

Figure 4A:
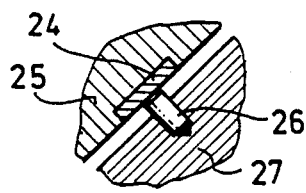
FIGS. 4a and 4b are like fragmentary sectional views, on enlarged scale, to show alternative contact relationships for one of a plurality of points which determine the zero position of the probe.
Figure 4B:
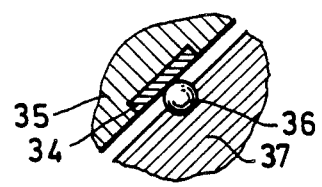

The six seating points 8 and 9 can be either convex-spherical or cylindrical formations, and they may be fixedly located either on the probe base 5 or on the inner surfaces of the bearing part 7. However, for wear-resistance and low friction, it is recommended, that, whether spherical (FIG. 4b) or cylindrical (FIG. 4a), the point formations 8 and 9 shall be features of the probe base and that seating engagement shall be to local-surface inserts 24(34) of hard metal, in the otherwise relatively soft material, e.g., aluminum 25(35), of the bearing part 7. The actual point for seating engagement at each of locations 8 and 9 is then established by the polished end of a hard-metal pin 26 (or by a hard ball 36) retained in the otherwise relatively soft material of the probe base 5 and in contact with a corresponding hardened seating surface 24(34).

Figure 3B:
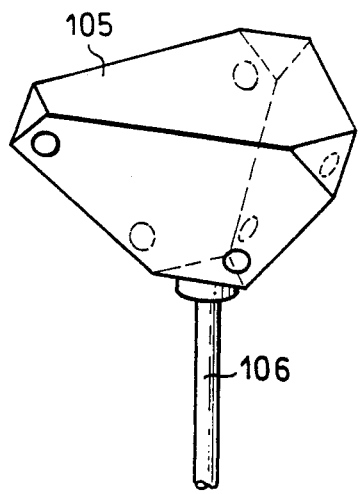
FIG. 3b is a similar perspective view of a probe as in FIG. 3a but in a slightly modified embodiment of the probe-mounting feature.

The precision of the six-point mounting depends, inter alia, on the bearing base, i.e., the radial distance of the seating points from the axis of symmetry of the truncated pyramid. For a given outside diameter of the probe head, this bearing base can be increased by beveling the corners of the truncated pyramid, as in the embodiment 105/106 shown in FIG. 3b.

Figure 3C:
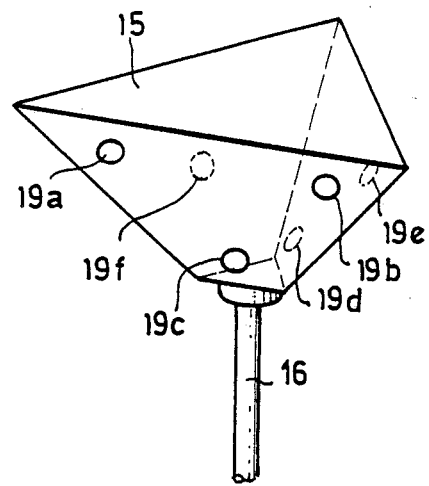
FIG. 3c is another perspective view to show the probe of FIG. 3a in an embodiment wherein slightly modified contact features determine the zero position of the probe.

Another embodiment, which constitutes an alternative with respect to the arrangement of the six seating points, is shown in FIG. 3c, wherein three seating points 19(a,b and c) are associated with one face of the pyramid, two seating points 19d and 19e are associated with a second face, while the third face has only one point 19f of seating engagement with the corresponding surface of the bearing part 7 in the probe head. In this case again, several (namely four) of the seating points are arranged on opposite sides of the centerlines of surfaces of the truncated pyramid (namely, points 19(a,b) of the one face, and points 19(d,e) of the second face), thereby assuring torsional rigidity of the probe-mounting configuration.

Figure 5:
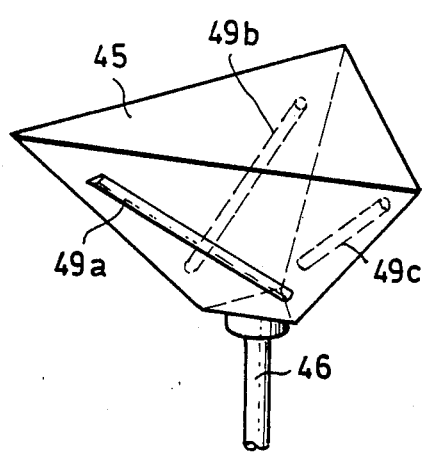

In the probe embodiment of FIG. 5, no discrete seating points are provided; rather, seating regions are developed along a straight-line seating engagement for each of the three faces of the base 45 of probe pin 46, and base 45 is developed as a truncated pyramid, having a cylindrical roller 49(a,b,c) of hard metal embedded in each of the three faces of the pyramid. The rollers 49(a,b,c) are arranged obliquely with respect to the centerlines of the faces of the truncated pyramid, and they cross said centerlines to assure the torsional rigidity of the probe-mounting configuration.

Figure 10:
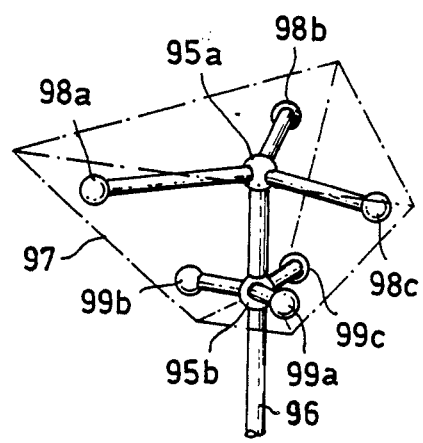

The embodiment of FIG. 10 shows that the probe base to be seated at 7 need not itself have the shape of a pyramid or of a truncated pyramid. In FIG. 10, three arms project radially from the probe-pin shaft 96, at an angular spacing of 120°, and at each of two axially spaced locations 95a and 95b; each of the three longer arms of the upper set terminates in a seating ball 98(a,b,c), and each of the shorter arms of the lower set terminates in a seating ball 99(a,b,c). These balls are so arranged in space that they lie as paired balls (98a-99a, 98b-99b, 98c-99c) on the respective geometric inner faces of the frustum of a truncated triangular pyramid. Since the upper and lower three-ball sets 98(a,b,c) and 99(a,b,c) are at angular offest with respect to each other about the longitudinal axis of the probe pin, the principle of FIGS. ½ is again satisfied, for torsionally rigid mounting of probe pin 96, when the associated bearing part 7 is formed as a negative truncated triangular pyramid having the same apex angle.

Experiments have shown that reproducibility of the fully seated (zero) position of the probe pin is particularly good if the apex half-angle that each truncated-pyramid face makes with the central axis of the probe pin is the same, and when such angle is selected in the range 35° to 55°.

Figure 6:
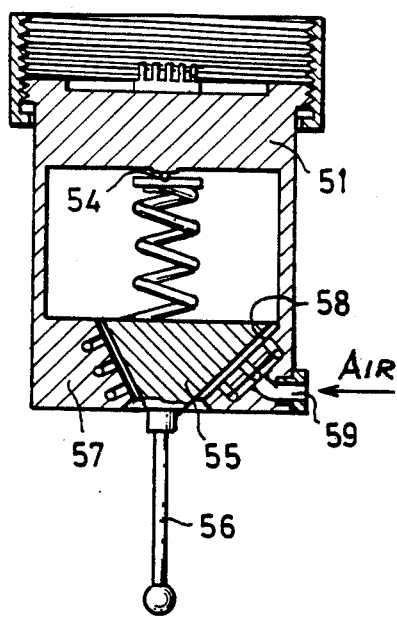
FIG. 6 is a simplified sectional diagram similar to FIG. 1 but for a probe head of different construction.

In the probe head of FIG. 6, the seating relationship between (a) the truncated-pyramid base 55 of the probe pin 56 and (b) the bearing configuration within part 57 of the housing 51 is an area-to-area relationship between corresponding truncated-pyramid surfaces, as distinguished from the punctiform or straight-line seating engagements (of above-described embodiments) with local surfaces of a geometric pyramid.

In order to avoid friction between the surfaces which seat upon each other and which would prevent a reproducible return of the probe pin 57 to its zero position, each of the inner wall surfaces (of truncated-pyramid configuration) of the mounting part 57 is developed as an air bearing. This does not result in any particularly great expense since coordinate-measuring instruments are usually mounted on air bearings, and thus a compressed-air supply for the inlet port 59 of probe head 51 is readily available. The base 55 of probe pin 56 therefore rides on an air cushion 58 which is about 2-micrometers thick; consequently, in the absence of a probe-deflecting force, the probe-pin base 55 can at all times return free of friction to the zero position determined by its bearing mount 57.

Figure 7:
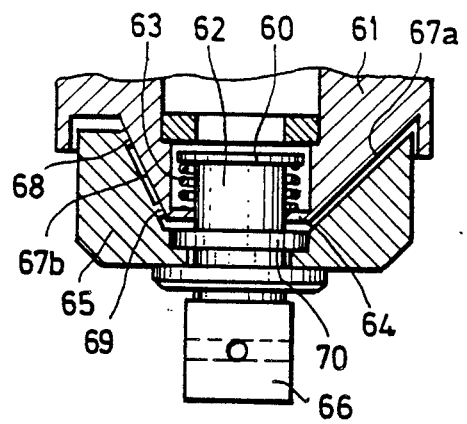
FIG. 7 is a vertical sectional view of an embodiment of mounting means of the invention, for the replaceable attachment of two parts to each other.

In each of the embodiments described above, probe pins are shown in which a deflectable or yieldable probe is served with a mounting embodiment of the invention. FIG. 7 now shows application of the invention to a chucking device, suitable for use on measurement machines for the automatically controlled interchangeable chucking of different probe pins on a given probe head, or of a complete auxiliary probe head on a given probe head.

In FIG. 7, the "fixed" receiving part of the chuck is designated 61. This receiving part 61 has the shape of a truncated triangular pyramid at its bottom end, the pyramid faces visible in the section of FIG. 7 being designated 67a and 67b. Within this receiving part 61, a combined permanent/electromagnet 62 is axially displaceable against the force of the spring 63, and in the direction toward the apex of the pyramid. Magnet 62 attracts an armature plate 70 in the chuck-compatible part 65 to be interchangeably held and thus holds this part, which is internally developed as a negative truncated pyramid, against the pyramid surfaces 67(a–c) of the mount.

The operation of the electromagnetic chucking device need not be described here since it operates, in principle, in the same way as the chucking device described in the aforementioned U.S. Pat. No. 4,637,119.

The interchangeable part 65, which is to be releasably chucked, is provided with six discrete seating points on its mating surfaces, and these seating points can, for example, have the three-dimensional arrangement shown in FIG. 3a or FIG. 3c, with respect to the faces of the truncated pyramid. At its lower end, the interchangeable part 65 is shown to include a mounting cube 66 to which several probe pins can be threaded in different alignments. With correspondingly large dimensioning, however, complete probe heads can also be carried by the interchangeable part 65, in which case not only mechanical probe heads but also optical probe heads such as, for example, so-called triangulation probes, can be used.

Figure 8:
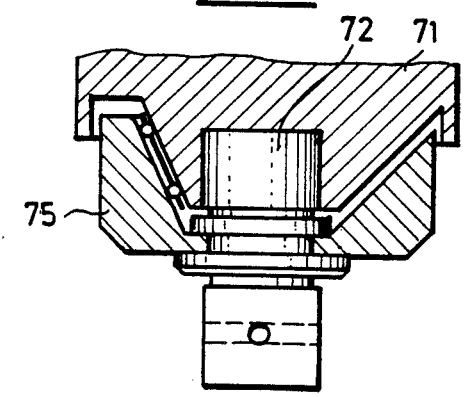
FIG. 8 is a view, similar to FIG. 7, of an embodiment which is slightly modified in respect of its bearing contact points.
Figure 9:
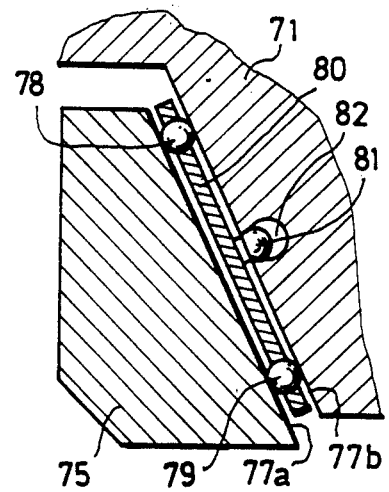
FIG. 9 is an enlarged fragment of FIG. 8 to show detail of involved bearing contact points.

In FIGS. 8 and 9, the interchangeable part of FIG. 7 is again shown in a slightly modified embodiment, wherein the carrier or receiving part is designated 71, and the combined permanent/electromagnet is designated 72. In contrast to FIG. 7, the seating points are developed as retained balls which are free to roll and which lie between (1) the three faces of the truncated pyramid on the receiving part 71 and (2) the corresponding three faces of the negative pyramid on the interchangeable part 75. As can be noted from the enlarged showing in FIG. 9, the balls 78 and 79 are retained between the surfaces 77b and 77a in a ball retainer 80, as of suitable plastic; and retainer 80 is held by pressing an integrally formed detent portion 81 of the retainer into an undercut groove or socket 82 in the receiving part 71. The ball retainer 80 will be understood to have the shape of a truncated pyramid and to position all six balls of the mount, being fastened to the receiving part 71 at each of several places, in the manner described for the detent engagement 81/82 in FIG. 9.

It is to be understood that, for simplicity of description, all embodiments have been described in the context of punctiform or other configurations involving truncated triangular pyramids, which are to be understood as preferably having three like isosceles-triangular sides, rising from an equilateral-triangle base, and truncated at a smaller equilateral-triangular section which is parallel to the base. But what has been said as to usefulness of triangular-pyramid relationships for repeatably determining a zero position is also applicable to polygonal-pyramid relationships having greater numbers of sides, as for example, the four sides of a square pyramid, truncated as described.

Furthermore, the seating points need not necessarily protrude from the retained part, they can also be arranged in the bearing mount, or they can be arrayed partially in the mount and partially on the retained part.

What is claimed is:

1. A mount for a displaceable probe part in a coordinate-measuring instrument, and wherein the mount comprises a fixed component and movably mounted component, one of which components having substantially the shape of a truncated pyramid having a central longitudinal axis, the movably mounted component being force-displaceable into a seated zero position with respect to the fixed component; and said seated position being determined by at least six locations which are spaced axially and radially from each other with respect to the longitudinal axis of the truncated pyramid (5,7;55,57;65,67).

2. A mount according to claim 1, wherein the movably mounted component (4,15,25,35,65,75,105) seats in the mount at six discrete seating points.

3. A mount according to claim 2, wherein at least some of the seating points (8a–c,9a–c) are located at opposite offsets from the centerlines (10a–c) of the side surfaces of the truncated pyramid (5,7).

4. A mount according to claim 3, wherein the truncated pyramid (5) is a triangular pyramid and that two seating points (8a/9a,8b/9b,8c/9c) are associated with each of the side surfaces of said pyramid.

5. A mount according to claim 3, wherein the truncated pyramid (15) is a three-sided pyramid and that three seating points (19a–c) are associated with the surface of one of the three sides, two seating points (19d,e) are associated with the surface of a second of the three sides, and one seating point (19f) is associated with the surface of the third side.

6. A mount according to claim 1, wherein the movably mounted component (45) seats in the mount along at least three contact lines (49a–c).

7. A mount according to claim 2, wherein each of said components has a body structure of relatively soft material and the seating locations are formed by inserts (24/26;34/36) of a material which is hard as compared to the respective body structure of said components (27/37;25/35).

8. A mount according to claim 1, wherein the movably mounted component (15) has a surface-to-surface confronting relation within and with respect to the fixed component (57) of the mount.

9. A mount according to claim 8, wherein the surface-to-surface confronting relation is one of closely spaced adjacency that is maintained by fluid flow between adjacent confronting surfaces.

10. A mount according to claim 1, wherein the movably mounted component is developed as a truncated pyramid (105) and that the corners of the truncated pyramid are partially beveled.

11. A mount according to claim 2, wherein each of the seating points is established by a rotatably mobile ball (78/79), and wherein said balls are retained in a ball cage (80).

12. A mount according to claim 4, (a) in which the movably mounted component comprises a mounting shaft having a central longitudinal axis, (b) in which one seating point for each of the three sides of the pyramid is a ball (98a,b,c) at the end of a first-radius rod connected to said shaft at a first axial location and at equal angular spacing from the other two first-radius rods, (c) in which a second seating point for each of the three sides of the pyramid is a ball (99a,b,c) at the end of a second-radius rod connected to said shaft at a second axial location and at equal angular spacing from the other two second-radius rods, and (d) in which the first-radius rods are at angular offset from the second-radius rods with respect to the longitudinal axis.

13. A mount according to claim 1, wherein the movably mounted component is a deflectable probe pin.

14. A mount according to claim 1, wherein the movably mounted component is a replaceable probe pin.

15. A mount according to claim 1, wherein the movably mounted component includes chucking means for interchangeable probe-pin accommodation.

16. A mount according to claim 1, wherein the movably mounted component includes checking means for interchangeable probe-head accommodation.

17. A mount according to claim 1, wherein the movably mounted component includes electromagnetic chucking means for interchangeable accommodation of selected work-contactable means.

18. A mount according to claim 1, wherein the movably mounted component (45) seats in the mount along at least three lines (49a–c) of seating contact, each of said lines spanning at least two of said six locations, and wherein each of said components has a body structure of relatively soft material with embedded inserts of a material which is hard as compared with the body material of said structures.

19. Probe means for a coordinate-measuring machine, said probe means comprising a mounting shaft having a central longitudinal axis, a first set of three balls each of which is connected by a first-radius rod to said shaft at a first axial location, said first-radius rod connections being oriented to fixedly locate the three balls of said first set at equal angular spacing and at identical first radii with respect to said axis; a second set of three balls each of which is connected by a second-radius rod to said shaft at a second axial location, said second-radius rod connections being oriented to fixedly locate the three balls of said second set at equal angular spacing and at identical second radii with respect to said axis; the three balls of said first set being at angular offset with respect to the three balls of said second set.

20. Probe means for a coordinate-measuring machine, said probe means comprising a mounting body have a tri-angular-pyramidal base with three sides inclined to and angularly spaced about a central longitudinal axis of said body base, and at least six seat-engageable balls fixedly and collectively carried by the sides of said body base at locations which are axially and radially spaced from each other with respect to said central longitudinal axis.

21. Probe means according to claim 20, wherein a pair comprising two of said balls is associated with each of the sides of said base body, the balls of each pair being located at opposite offsets from the centerline of of said surface to which it is fixed.

22. Probe means according to claim 20, wherein three of said balls are associated with a first of said sides, two of said balls are associated with a second of said sides, and one of said balls is associated with the third side.

23. Probe means for a coordinate-measuring machine, said probe means comprising a mounting body having a tri-angular-pyramidal base with three sides inclined to and angularly spaced about a central longitudinal axis of said body base, and at least three seat-engageable cylindrical rods fixedly and collectively carried by the sides of said base at locations which are axially and radially spaced from each other with respect to the central longitudinal axis, there being at least one rod associated with each of said sides, and each rod being inclined to and traversing the centerline of the side surface to which it is fixed.

* * * * *